Jan. 25, 1955 N. W. ROBERTS 2,700,282
FRACTIONAL SEPARATION OF AIR
Original Filed Feb. 8, 1949 2 Sheets-Sheet 1
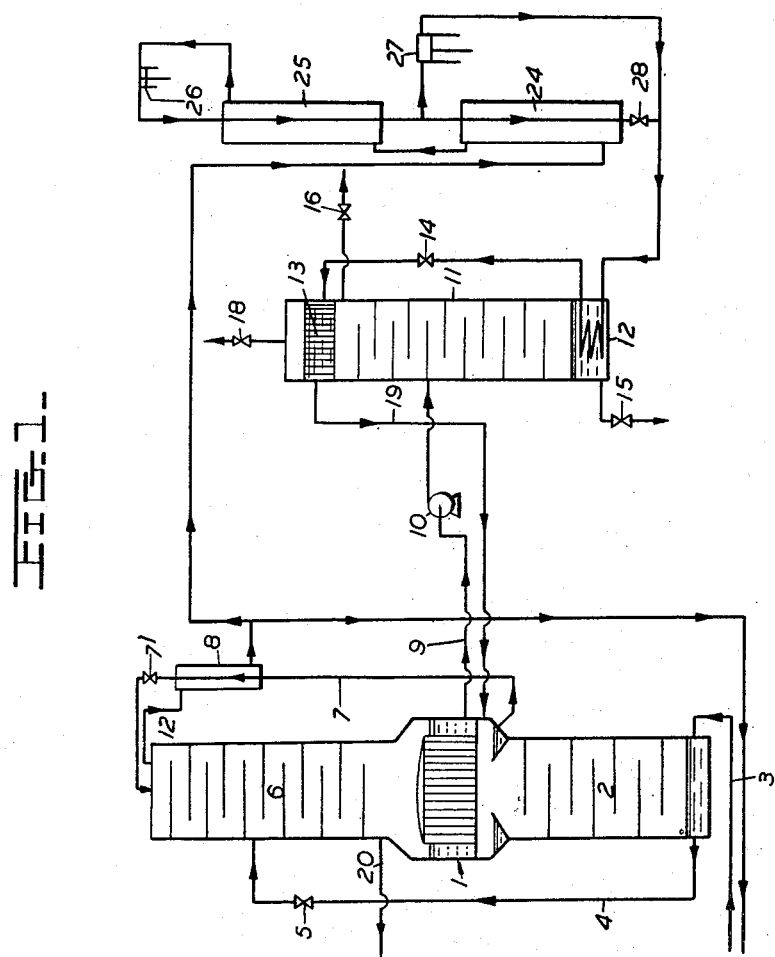
INVENTOR
NEVILLE WYN ROBERTS
BY
C. W. Deller
ATTORNEY

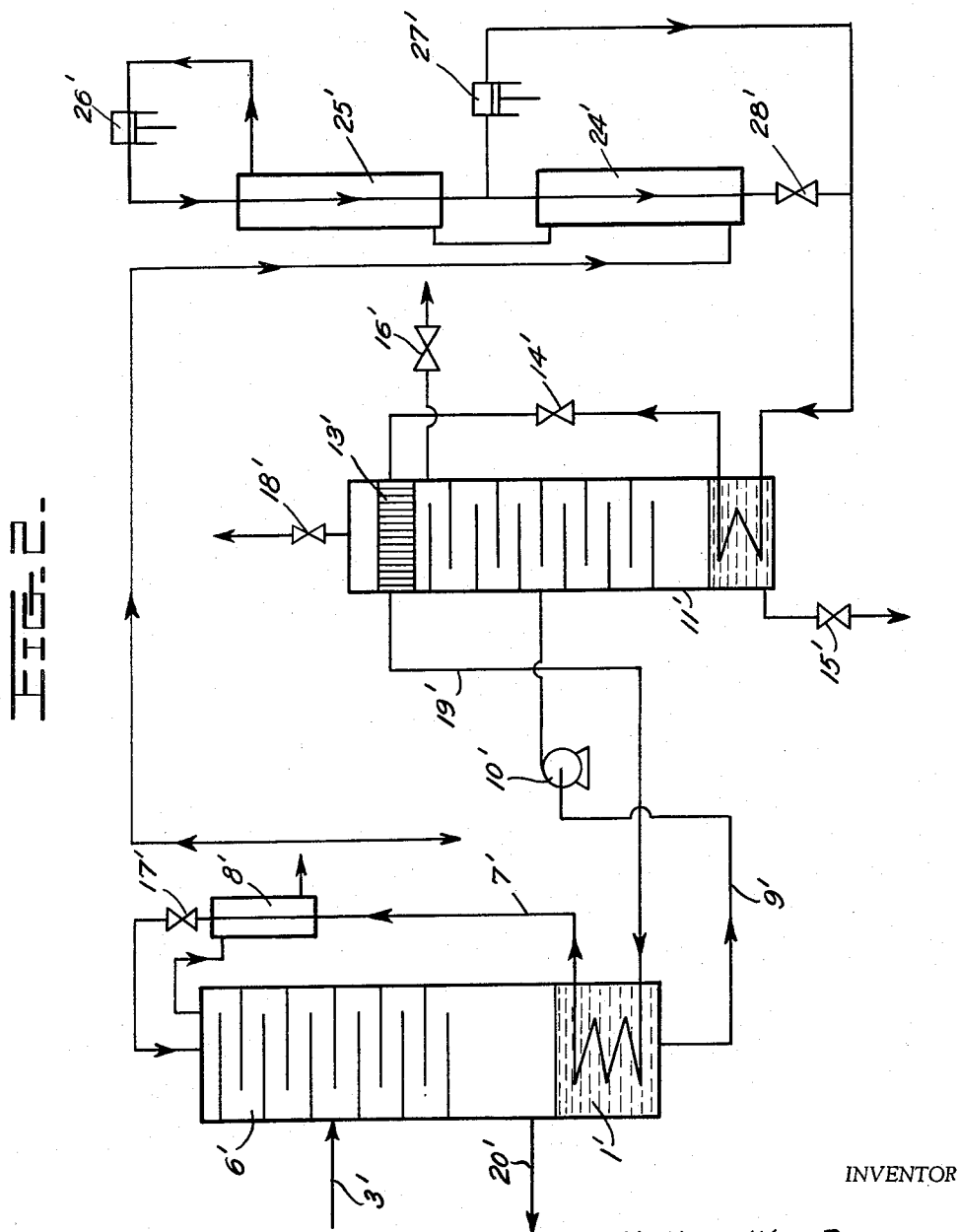

United States Patent Office 2,700,282
Patented Jan. 25, 1955

2,700,282

FRACTIONAL SEPARATION OF AIR

Neville Wyn Roberts, West Wimbledon, London, England, assignor to The British Oxygen Company Limited, London, England, a British company Original application February 8, 1949, Serial No. 75,109. Divided and this application June 4, 1951, Serial No. 229,689

Claims priority, application Great Britain February 12, 1948

4 Claims. (Cl. 62—175.5)

The present invention relates to the fractional separation of air, and this application is a division of my prior application Serial No. 75,109, filed February 8, 1949, now U. S. Patent No. 2,559,132, granted July 3, 1951.

In the fractional separation of air there is frequently employed a rectification process by means of which three fractions respectively rich in nitrogen, argon and oxygen are obtained. Such a separation is usually carried out in the well-known double column in which the liquid nitrogen fraction separated in the lower column is after expansion introduced into the upper column to serve as reflux. For the production of the argon fraction, however, it is necessary to add to the double column an auxiliary column, the reflux for which is obtained by indirect heat exchange with either a part of the liquid nitrogen fraction or with a part of the so-called "rich liquid" obtained from the lower column.

In such a double column separation process where the reflux medium is divided between the upper column and the aforesaid auxiliary column, there is not sufficient reflux available to make possible the separation of all three constituents in high yield and at a high purity. The separation of a fraction rich in argon in an auxiliary column as described above requires reflux which can only be obtained by diminishing the amount of reflux available for the double column separation and consequently by decreasing the yield or purity of either the oxygen-rich or nitrogen-rich fraction.

The complete separation of the air into its three main components can only be effected by the expenditure of more power than is required to operate the aforesaid double column separation process.

According to this invention there is provided a process for separating argon from air which comprises treating the air in a primary rectification zone in such a manner as to produce therein as one of the separation products a liquid argon-oxygen fraction, increasing the pressure of such fraction and transferring it to a secondary rectification zone which operates under elevated pressure wherein it is separated into an argon-rich fraction and a substantially pure oxygen fraction, the necessary temperature gradient in the said secondary rectification zone being maintained by the indirect condensation and revaporisation of gaseous nitrogen separated in the primary rectification zone, the revaporisation taking place at such a pressure that the vaporised nitrogen can act as reflux medium in the primary rectification zone.

It will be understood that the fluid prior to its introduction into the secondary rectification zone must be cooled substantially to its condensation temperature.

Where the primary rectification zone operates with two-stage rectification, the nitrogen after having served to maintain the necessary temperature gradient in the secondary rectification zone may be introduced into the first stage of the two-stage rectification constituting the primary rectification zone.

A fraction rich in argon can also be recovered according to this invention where single stage rectification is carried out in the primary rectification zone, a circulating stream of nitrogen being used as reflux medium.

It is known that the amount of reflux necessary to separate a given quantity of air into an oxygen-argon mixture and nitrogen is substantially less than that required to separate the oxygen-argon mixture so obtained into oxygen and argon. Thus, in the particular case in which all the oxygen withdrawn as the oxygen-argon fraction from the primary rectification zone is separated and withdrawn as pure oxygen in the secondary rectification zone, only a part of the nitrogen which has been used for maintaining the necessary temperature gradient in the secondary rectification zone will be needed to act as a source of reflux in the primary rectification. The remainder of this nitrogen which will be at its vaporisation pressure will therefore be available for other purposes.

This excess can be used for the production of additional cold by isentropic expansion. The cold produced by expansion can be used to undercool the liquid oxygen product from the secondary rectification zone thus avoiding undesirable flash losses.

Alternatively the excess of nitrogen from the secondary rectification zone may be usefully employed in assisting in the compression of the argon-oxygen liquid fraction thereby economising in compression energy.

Still another method of utilising the excess nitrogen from the secondary rectification zone is to carry out further rectification processes such as the production of nitrogen of extra high purity or the concentration of krypton and xenon from the oxygen obtained in the secondary rectification zone.

The invention will now be more particularly described with reference to the accompanying drawing which shows in conventional diagrammatic form an air separation process for producing an argon fraction, a nitrogen fraction and a gaseous oxygen fraction containing 96–98% oxygen.

Figure 1 is a diagrammatic illustration of the process of this invention using a double column in the primary rectification zone.

Figure 2 is an illustration of an alternative process using a single column instead of a double column in the primary rectification zone.

A primary rectification zone is formed as shown in Fig. 1 by a double column 1 comprising in known manner a lower column 2 to which compressed air at its dew point is fed through a pipe 3. In the lower column 2 there accumulates at the base an oxygen-rich fraction which is transferred through pipe 4 and expansion valve 5 to the upper column 6 of the primary rectification zone, and at the upper end a nitrogen-rich fraction which is transferred through pipe 7 to the top of the upper column, passing beforehand through a heat exchanger 8 in heat exchange relationship with the effluent nitrogen from the column 6. In the upper column the air is separated into a nitrogen fraction which leaves the top of the column and is passed through the heat exchanger 8 as aforesaid, and a liquid argon-oxygen fraction which collects at the base of the upper column. A gaseous oxygen fraction may be withdrawn through pipe 20 leaving the column 6 at a point above the liquid argon/oxygen fraction which collects at the base of the column. The liquid fraction is withdrawn through pipe 9, compressed in a compressor 10 and then introduced into a simple column 11 constituting a secondary rectification zone.

The necessary reflux to operate the simple column 11 constituting the secondary rectification zone is obtained from a portion of the nitrogen leaving the top of the upper column 6. This is raised to approximately atmospheric temperature by heat exchange in exchangers 24 and 25, compressed to a high pressure in a compressor 26 and returned in counter-current flow to the cold nitrogen through heat exchanger 25. One portion of the compressed nitrogen is then expanded to a pressure of about 10 atmospheres absolute in an expansion machine 27 whereby it is further cooled, and the other portion is liquefied by counter-current heat exchange with the cold nitrogen fraction in exchanger 24. After expansion in a valve 28 to 10 atmospheres absolute pressure, this liquefied portion is mixed with the exhaust from expansion engine 27 and admitted as a mixture of vapour and liquid to a coil 12 in the base of the secondary column 11, where it is condensed by indirect heat exchange with the substantially pure liquid oxygen boiling in the base thereof. The condensed liquid nitrogen is then expanded at valve 14 to a pressure substantially equal to that of the lower column 2 of the double column 1, usually at 5.5 atmospheres absolute. The expanded nitrogen is passed through the condenser 13 where it is partially vaporised by indirect heat exchange with the vapours rich in argon at the top of the secondary column 11. These argon-rich vapours are thereby condensed and returned as reflux to the secondary column. The nitrogen leaving the condenser 13 is returned to the upper end of the lower column where it is totally condensed and used as reflux in the customary manner.

A substantially pure liquid oxygen product is withdrawn from the secondary column 11 through valve 15 and a fraction rich in argon is withdrawn from the top of the secondary column 11 through valve 16. Traces of nitrogen which might collect at the top of the secondary column 11 may be vented through valve 18.

A primary rectification zone is formed as shown in Fig. 2 by a single column 1' to which air at its dew-point is fed through a pipe 3'. In the column the air is separated into a nitrogen fraction which leaves the top of the column and is passed through the heat exchanger 8', and a liquid argon-oxygen fraction which collects at the base of the column. A gaseous oxygen fraction may be withdrawn through pipe 20' leaving the column 6' at a point above the liquid argon/oxygen fraction which collects at the base of the column. The liquid fraction is withdrawn through pipe 9', compressed in a pump 10' and then introduced into a single column 11' constituting a secondary rectification zone.

The necessary reflux to operate the columns 6' and 11' is obtained from a portion of the nitrogen leaving the top of the column 6'. This is raised to approximately atmospheric temperature by heat exchange in exchangers 24' and 25', compressed to a high pressure in a compressor 26', and returned in counter-current flow to the cold nitrogen through heat exchanger 25'. One portion of the compressed nitrogen is then expanded to a pressure of about 10 atmospheres absolute in an expansion machine 27' whereby it is further cooled, and the other portion is liquefied by countercurrent heat exchange with the cold nitrogen fraction in exchanger 24'. After expansion in a valve 28' to 10 atmospheres absolute pressure, this liquefied portion is mixed with the exhaust from expansion engine 27' and admitted as a mixture of vapour and liquid to a coil 12' in the secondary column 11', when it is condensed by indirect heat exchange with the substantially pure liquid oxygen boiling the base thereof. The condensed liquid nitrogen is then expanded at valve 14' to a pressure at which after evaporation it may be condensed in liquid oxygen boiling in the reboiler of column 6', i. e. about 5.5 atmospheres absolute. The expanded nitrogen is passed through the condenser 13' where it is partially vaporized by indirect heat exchange with the vapours rich in argon at the top of the secondary column 11'. These argon-rich vapours are thereby condensed and returned as reflux to the secondary column. The nitrogen leaving the condenser 13' is passed through the reboiler 1' in the primary column 11', where it is totally condensed by heat exchange with the liquid oxygen/argon fraction boiling in the reboiler. The liquid nitrogen thus formed is transferred through pipe 7' to the top of the primary column, passing beforehand through a heat exchanger 8' in heat exchange relationship with the effluent nitrogen from the primary column.

A substantially pure liquid oxygen product is withdrawn from the secondary column 11' through valve 15' and a fraction rich in argon is withdrawn from the top of the secondary column 11' through valve 16'. Traces of nitrogen which might collect at the secondary column 11' may be vented through valve 18'.

I claim:

1. A process for separating argon from air which comprises treating the air in a primary rectification zone in such a manner as to produce therein a liquid oxygen argon fraction and a gaseous nitrogen fraction, mechanically increasing the pressure of at least a part of such liquid oxygen-argon fraction and transferring it to a secondary rectification zone which operates under elevated pressure wherein it is separated into an argon-rich fraction and a substantially pure oxygen fraction, and maintaining the necessary temperature gradient in the said secondary rectification zone by the condensation and re-vaporisation by indirect heat exchange therein of at least a part of the said gaseous nitrogen fraction separated in the said primary rectification zone, the revaporisation taking place at such a pressure that the vaporised nitrogen fraction acts as reflux medium in the primary rectification zone.

2. A process for separating argon from air which comprises treating the air in a primary rectification zone in such a manner as to produce therein a liquid oxygen-argon fraction and a gaseous nitrogen fraction, mechanically increasing the pressure of at least a part of such liquid oxygen-argon fraction and transferring it to a secondary rectification zone which operates under elevated pressure wherein it is separated into an argon-rich fraction and a substantially pure oxygen fraction, and providing reboil and reflux in the said secondary rectification zone by the successive condensation in the reboiler and re-evaporation in the reflux condenser of the said secondary rectification zone of at least a part of the said gaseous nitrogen separated in the said primary rectification zone, the re-vaporization taking place at such a pressure that the vaporized nitrogen fraction can subsequently act as reflux medium for the primary rectification zone.

3. Process according to claim 2 wherein the primary rectification zone operates with two-stage rectification and wherein the nitrogen fraction after having served as medium for reboil and reflux for the secondary rectification zone is introduced into the first stage of the two-stage rectification constituting the primary rectification zone.

4. Process according to claim 2 wherein the primary rectification zone operates with single stage rectification in which the reflux medium is provided by recirculating the gaseous nitrogen produced therein and wherein part of the gaseous nitrogen produced in the primary rectification zone after having served as medium for reboil and reflux for the secondary rectification zone is introduced into the primary rectification zone as reflux therein.

References Cited in the file of this patent

UNITED STATES PATENTS

| 1,619,909 | Wilkinson | Mar. 8, 1927 |
| 1,638,005 | Le Rouge | Aug. 2, 1927 |
| 1,880,981 | Pollitzer | Oct. 4, 1932 |
| 2,101,300 | Weil | Dec. 7, 1937 |
| 2,423,274 | Van Nuys | July 1, 1947 |
| 2,482,304 | Van Nuys | Sept. 20, 1949 |
| 2,545,462 | Haynes | Mar. 20, 1951 |
| 2,567,461 | Aicher | Sept. 11, 1951 |